July 23, 1935.　　　H. E. JOHNSON　　　2,008,830

SEALING MEANS

Filed Jan. 16, 1932

Inventor:
Harold E. Johnson,
By Dyrenforth, Lee, Chritton and Wiles
Attorney

Patented July 23, 1935

2,008,830

UNITED STATES PATENT OFFICE 2,008,830

SEALING MEANS

Harold E. Johnson, Evanston, Ill., assignor to Chicago Rawhide Manufacturing Company, Chicago, Ill., a corporation of Illinois Application January 16, 1932, Serial No. 587,072

2 Claims. (Cl. 64—89)

My invention relates to oil or grease seals or retainers for use more particularly in structures of such character, such as the universal joints of automobile propeller shafts, that the seal or retainer is required to be carried by an inner member of the structure and forms the seal between the outer marginal edge of the seal or retainer and an outer member of the structure.

My objects are to provide means for effectually sealing such type of structures and more particularly the universal joints of automobile propeller shafts against the escape of the lubricant from the casings surrounding the joints; to provide a novel, simple and economical construction of sealing means of the type in which the seal is effected at the outer marginal edge of the sealing means; and other objects as will be manifest from the following description.

Referring to the accompanying drawing.

Figure 1:
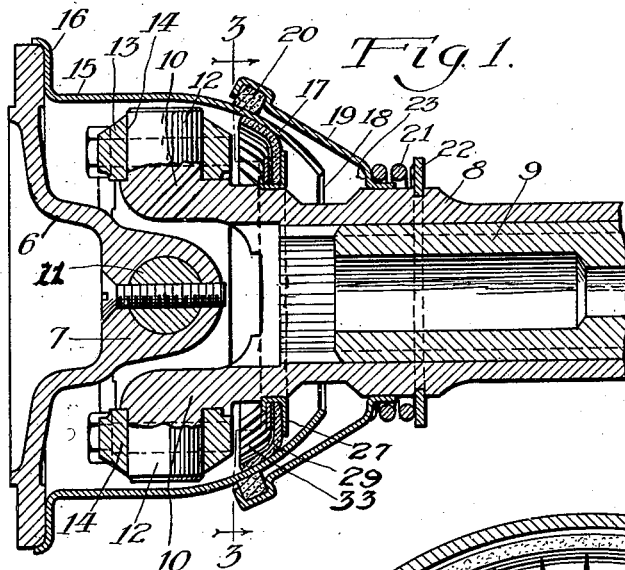
Figure 1 is a view in longitudinal sectional elevation of the universal-joint portion of an automobile propeller shaft embodying my invention.

Referring to the particular construction shown in the drawing wherein the invention is illustrated as embodied at the universal joint of an automobile propeller shaft of a well known construction, 6 represents a plate which in practice is connected with one shaft-section (not shown) of the propeller shaft and is provided with spaced apart arms one of which, shown in section, is represented at 7, these arms forming a yoke. 8 represents a sleeve in driving engagement with the other shaft section 9 of the propeller shaft and having spaced apart arms 10 forming a yoke. The arms 7 and 10 are disposed at 90° to each other, the arms 7 being provided with journaling pins, one of which is represented at 11 and the arms 10 being provided with journaling pins 12, these four pins being disposed in a common plane transverse to the longitudinal axis of the propeller shaft.

Surrounding the yokes formed of the arms 7 and 10, is a ring 13 formed of two similar sections of ring shape which are secured flatwise together. The ring 13 contains four radially extending openings therethrough equidistantly disposed about the circumference of the ring and in which the pins 11 and 12 have journal fit, the openings in the ring and into which the pins 12 extend being represented at 14. The parts thus described form a universal joint.

The structure just described is surrounded by a shell 15 secured at a flange 16 thereon to the outer edge of the plate 6 the end of the shell opposite that at which it is secured to the plate being of general spherical form as represented at 17, its terminal end containing a relatively large opening 18 through which the sleeve 8 extends, permitting the sections of the propeller shaft to assume different angular positions relative to each other without obstruction by the shell 17.

The structure shown also comprises an outer casing section 19 surrounding, and slidable along, the sleeve 8 and bearing at an annular ring 20 of packing thereon, against the outer surface of the spherical portion 17 of the casing shell 15, the packing 20 being held against the shell 15 by a coil spring 21 surrounding the sleeve 8 and interposed between a stop ring 22 on this sleeve and the adjacent shouldered portion 23 of the casing section 19.

In accordance with the particular illustrated embodiment of my invention, I provide means interposed between the sleeve 8 and the casing 17 and bearing against the inner surface of the latter, for preventing escape of the lubricant from the interior of the universal joint, these means in the form shown comprising a ring 24 supported on, and having tight engagement with an annular seating surface 25 on the sleeve 8 and shown as annularly shouldered at 26, the ring 24 being provided with annular outwardly extending flanges 27 and 28 at its ends. Surrounding the ring 24 is an annular ringlike packing member 29 of flexible material as for example leather of such size that its outer marginal edge portion 30 extends in deflected condition flatwise against the inner surface of the spherical portion 17 of the casing shell 15 as shown.

Figure 2:
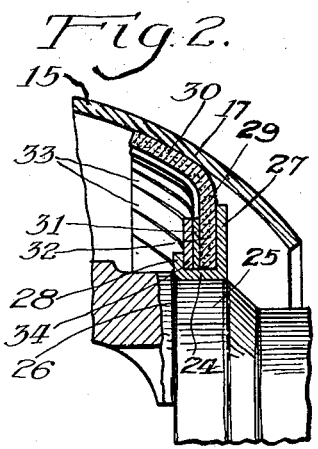
Figure 2 is an enlarged fragmentary view, partly in elevation and partly sectional, of a portion of the structure of Fig. 1.
Figure 3:
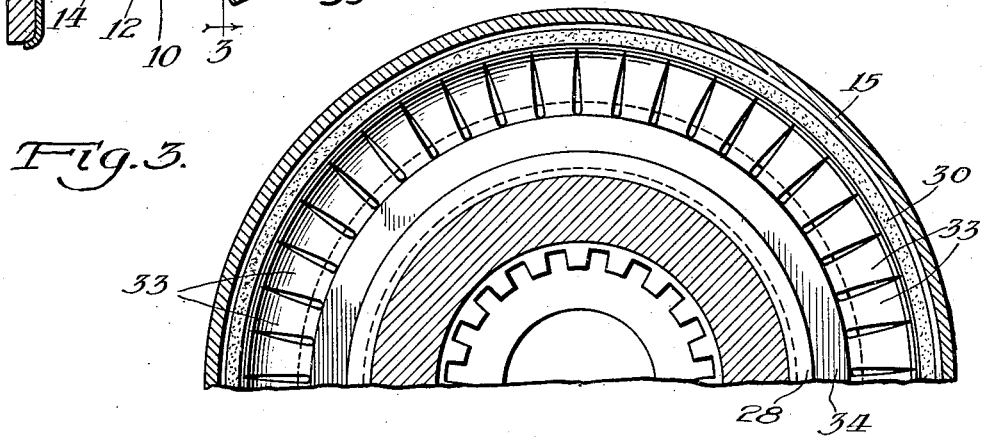
Figure 3 is a broken enlarged section taken at the line 3 on Fig. 1 and viewed in the direction of the arrow.

The sealing member 29 is held constantly in close, sealing engagement at its outer marginal portion 30 with the casing shell 15, regardless of the different angular positions assumed by the shaft sections of the propeller shaft relative to each other, by a spring member 31 shown as of ring form providing a solid inner ring portion 32 at which it surrounds the ring 24 and from which a circular series of spring tongues 33 integral with the ring portion 32, radiate the member 31 fitting flatwise against the adjacent face of the ring 29 and conformingly fitting at its tongues 33 in the flexed condition of the device as shown in Figs. 1, 2 and 3, against the marginal portion 30 of the sealing ring 29, these tongues under their spring tension urging the marginal portion 30 in close sealing engagement with the shell 15.

The sealing means are also shown as comprising a ring 34 surrounding the ring 24 and fitting flatwise against the ring portion 32 of the member 31. In the manufacture of the sealing means, the sealing member 29, ring 31 and ring 34 are slipped, in succession, and in the order named, over the end of the ring 24, before providing the flange 28 thereon, and these several parts rigidly secured together to form a unit by spinning over the outer end of the ring 24 to form the flange 28.

Figure 4:
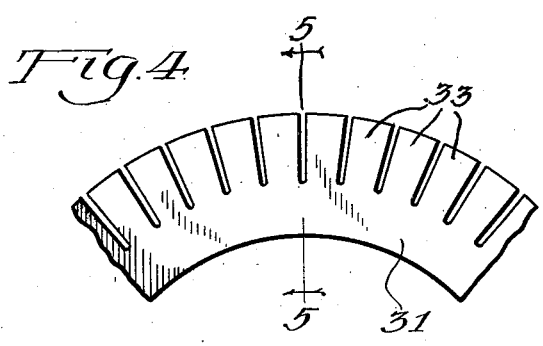
Figure 4 is a face view of a segmental portion of a spring-tongue-equipped ring forming a part of the sealing means of the preceding figures.
Figure 5:
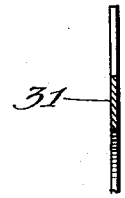
Figure 5 is a section taken at the line 5—5 on Fig. 4 and viewed in the direction of the arrows.

The spring member 31 in normal condition is preferably flat as shown in Figs. 4 and 5 and in the assembling of the sealing means with the structure to be sealed, the tongues 33 become deflected, together with the outer marginal portion 30 of the sealing member 29, thus causing these tongues to exert force against the marginal portion 10 tending to straighten the member 29, the provision of the several tongues disposed in a circumferential arrangement insuring of the production of an effective seal regardless of the angle at which the shaft sections, at opposite sides of the universal joint, extend in the operation of the shaft.

While I have illustrated and described a certain particular construction of sealing means and have shown it as embodied in a certain type of structure, I do not wish to be understood as limiting my invention thereto as the construction of the sealing means may be variously modified and altered and the sealing means utilized in connection with other forms of structures without departing from the spirit of my invention.

What I claim as new, and desire to secure by Letters Patent, is:

1. A preassembled sealing means for universal joints comprising, the combination with two telescopically related sections of a universal joint, of a ring having a radially extending flange, said ring to be maintained in axial alignment with and adapted to be seated upon one of two telescopically related sections of the universal joint; a cup member of flexible material, as leather, having an opening in its center and adapted to bear at its outer face flatly against an interior spherical surface of the other of said sections at a substantial angle to the axis of the joint; a ring member disposed against said cup member and having radially projecting spring portions to press the flange of said cup member against said surface, one of said members being seated against said flange, and means for clamping said parts in assembled relation.

2. In a shaft joint, two universally connected members for attachment to shaft sections, a sheet metal housing on one of the members provided beyond the center of the universal connection with a converging semi-spherical portion which is curved about the center of said connection, and a self-contained sealing unit on the other member in engagement with the semi-spherical inner wall of the housing; said unit including a sheet metal ring about its inner periphery which is press-fitted on the member a substantial distance from the center of the universal connection, and a soft flexible spring-pressed flange which is flexed at an angle of approximately 45° into parallel contiguous engagement with the spherical portion throughout substantially the entire extent of the flange.

HAROLD E. JOHNSON.